April 3, 1951 I. GHERTMAN 2,547,457

DRIVE MEANS FOR RECIPROCABLE TYPE BARS

Filed Feb. 4, 1948 8 Sheets-Sheet 1

INVENTOR
Ioino Ghertman
BY
Edward R Saunders
AGENT

INVENTOR
Ioino Ghertman
BY
Edward R. Lowndes
AGENT

April 3, 1951 I. GHERTMAN 2,547,457

DRIVE MEANS FOR RECIPROCABLE TYPE BARS

Filed Feb. 4, 1948 8 Sheets-Sheet 3

INVENTOR
Ioino Ghertman
BY
Edward R. Saunders
AGENT

DRIVE MEANS FOR RECIPROCABLE TYPE BARS

Filed Feb. 4, 1948

INVENTOR
Ioino Ghertman
BY
Edward R. Lowndes
AGENT

| | 9 | 8 | 7 | 6 | 5 | 4 | 3 | 2 | 1 |
|---|---|---|---|---|---|---|---|---|---|
| 12 | I | H | G | F | E | D | C | B | A |
| 11 | R | Q | P | ALP O | N | M | L | K | J |
| O | Z | Y | X | W | V | U | T | S | NUM O |

INVENTOR
Ioino Ghertman
BY
Edward R. Lowndes
AGENT

April 3, 1951 I. GHERTMAN 2,547,457

DRIVE MEANS FOR RECIPROCABLE TYPE BARS

Filed Feb. 4, 1948 8 Sheets-Sheet 6

INVENTOR
Ioino Ghertman
BY
Edward R. Lowndes
AGENT

April 3, 1951 I. GHERTMAN 2,547,457

DRIVE MEANS FOR RECIPROCABLE TYPE BARS

Filed Feb. 4, 1948 8 Sheets-Sheet 7

INVENTOR
Ioino Ghertman
BY
Edward R. Lowndes
AGENT

April 3, 1951 I. GHERTMAN 2,547,457

DRIVE MEANS FOR RECIPROCABLE TYPE BARS

Filed Feb. 4, 1948 8 Sheets-Sheet 8

INVENTOR
Ioino Ghertman
BY
Edward R. Lowndes
AGENT

Patented Apr. 3, 1951

2,547,457

UNITED STATES PATENT OFFICE 2,547,457

DRIVE MEANS FOR RECIPROCABLE TYPE BARS

Ioino Ghertman, Saint-Mande, France, assignor to International Business Machines Corporation, New York, N. Y., a corporation of New York Application February 4, 1948, Serial No. 6,177
In France June 22, 1945

Section 1, Public Law 690, August 8, 1946
Patent expires June 22, 1965

8 Claims. (Cl. 101—93)

The present invention relates to printing mechanisms and, more particularly, to such mechanisms which are adapted for use in connection with accounting machines of the record controlled tabulator type.

It is among the principal objects of the invention to provide a more positive drive than has been heretofore attainable for the various type bars associated with the machine in order that they may be positively moved to their final positions with the type thereon in exact alignment with the printing line of the printing platen prior to engagement thereof by the printing hammer during the printing portion of the machine cycle.

In carrying out the above mentioned object, the invention contemplates the provision of a tabulating mechine having the usual vertically reciprocable type bars carrying movable type, together with means whereby selective movement of the bars from their lowered positions to their operative printing positions is effected under the direct and positive control of a series of rotary clutch devices which are geared directly thereto and which derive their movements under the control of the record or card analyzing mechanism of the tabulating machine.

Another and equally important object of the invention is to provide, in a tabulating machine, a control mechanism for moving the type bars thereof in such a manner that those type bars which are not selected for a printing operation by virtue of the presence of one or more perforations in the same corresponding column of the card at the analyzing station remain at rest during each printing cycle, while those type bars which are selected for a printing operation become elevated due to the presence of one or more perforations in the column. In this manner a great deal of useless motion of the type bars as well as of their various operating instrumentalities is eliminated, thus reducing the overall wear and tear on the tabulating machine as a whole.

According to the present system, numerical characters are represented on the well-known Hollerith tabulating card by a single perforation in a column of the record card, while alphabetical characters are represented by two perforations located at different index point positions in a single card column. One of these latter perforations is known as the digit or numeric perforation and the other is known as the zone perforation. The record cards are passed through the usual card feeding and analyzing devices so oriented that as they pass a set of analyzing brushes the digit perforation in each column is first analyzed and the zone perforation, if any, is subsequently analyzed by the same analyzing brush. The analysis of a single perforation or the successive analyses of both perforations in a single card column control the positioning of the corresponding type bar and type elements thereon to select the particular numerical or alphabetical character represented by the arrangement of perforation or perforations, analyzed. The digit perforations are nine in number and are designated from 9 to 1, inclusive, in the order in which they pass the analyzing brush. The zone perforations are three in number and are designated 10, 11 and 12.

The manner in which such control is effected, according to the present invention, is predicated upon the fact that a selected type bar is not set into motion until such time as a digit perforation is encountered in its corresponding card column at the analyzing station and that it is set into its ascending motion immediately upon analysis of such a perforation. If no zone perforation is encountered subsequently in the same column of the record card, the type bar is automatically stopped at a predetermined point in the machine cycle, which occurs shortly after the last zone index point position has passed the analyzing station. If, on the other hand, a zone perforation is encountered, the type bar is stopped immediately upon analysis of this latter perforation.

During that portion of the machine cycle wherein the digit perforations are undergoing analysis, the type bars are moved upwardly, when and if a digit perforation is encountered, at a predetermined and relatively fast, uniform velocity.

During the portion of the machine cycle wherein the zone perforations are undergoing analysis, the type bars are moved upwardly at a relatively slow velocity. In other words, at the particular point in the machine cycle wherein the record card at the analyzing station passes from a condition of digit perforation analysis to a condition of zone perforation analysis, all of the type bars which are in motion, by virtue of the previous analysis of a digit perforation, are caused to undergo a sudden and negative change in velocity to bring their rate of travel to approximately one-fourth of their initial rate of travel for purposes that will become clear presently.

The arrangement of type upon the various type bars is necessarily predicated upon the special movements imparted to the latter, as outlined above. For descriptive purposes, the type elements may be regarded as being divided into groups of four adjacent type elements each. Bearing in mind that no type bar is set into ascending motion until a digit perforation is encountered in the corresponding card column, it will be appreciated that certain type bars will be set into motion before other type bars. The movements of the type bars are so correlated with the movement of the record card past the analyzing brush that group type selection will occur at the end of digit analysis, i. e., at the end of the period of fast travel of the type bars, and individual type selection within a previously selected group will occur during zone analysis of the card when a perforation is encountered or, if no perforation is encountered, at a fixed point in the machine cycle occurring after complete card analysis has taken place.

The provision of a tabulating machine whose printing functions depend and operate upon the principles briefly outlined above, both as to the positioning of the type elements upon the type bars and as to the differential rates of movement of the type bars, is a further and important object of the present invention.

Another object of the invention is to provide a printing mechanism for tabulating machines wherein a positive and adjustable locking means is afforded for each type bar when the latter arrives in printing position to insure accurate alignment of the type elements with the printing line of the printing platen and wherein a positive unlocking action is effected after the printing operation to permit restoration of the type bars to their inoperative positions of rest prior to the next succeeding printing operation.

A still further object of the invention is to provide an improved restoring means for the type bars wherein they are all brought to their position of rest simultaneously at a decelerating rate of travel.

Yet another object of the invention in a machine of this character is to provide a novel form of speed change mechanism for imparting different rates of movement to the type bars with the change becoming effective on all of the bars simultaneously, regardless of their relative positions at the time the change becomes effective.

Other objects of the invention will be pointed out in the following description and claims and illustrated in the accompanying drawings, which disclose, by way of example, the principle of the invention and the best mode, which has been contemplated, of aplying that principle.

Figures 11, 11A:
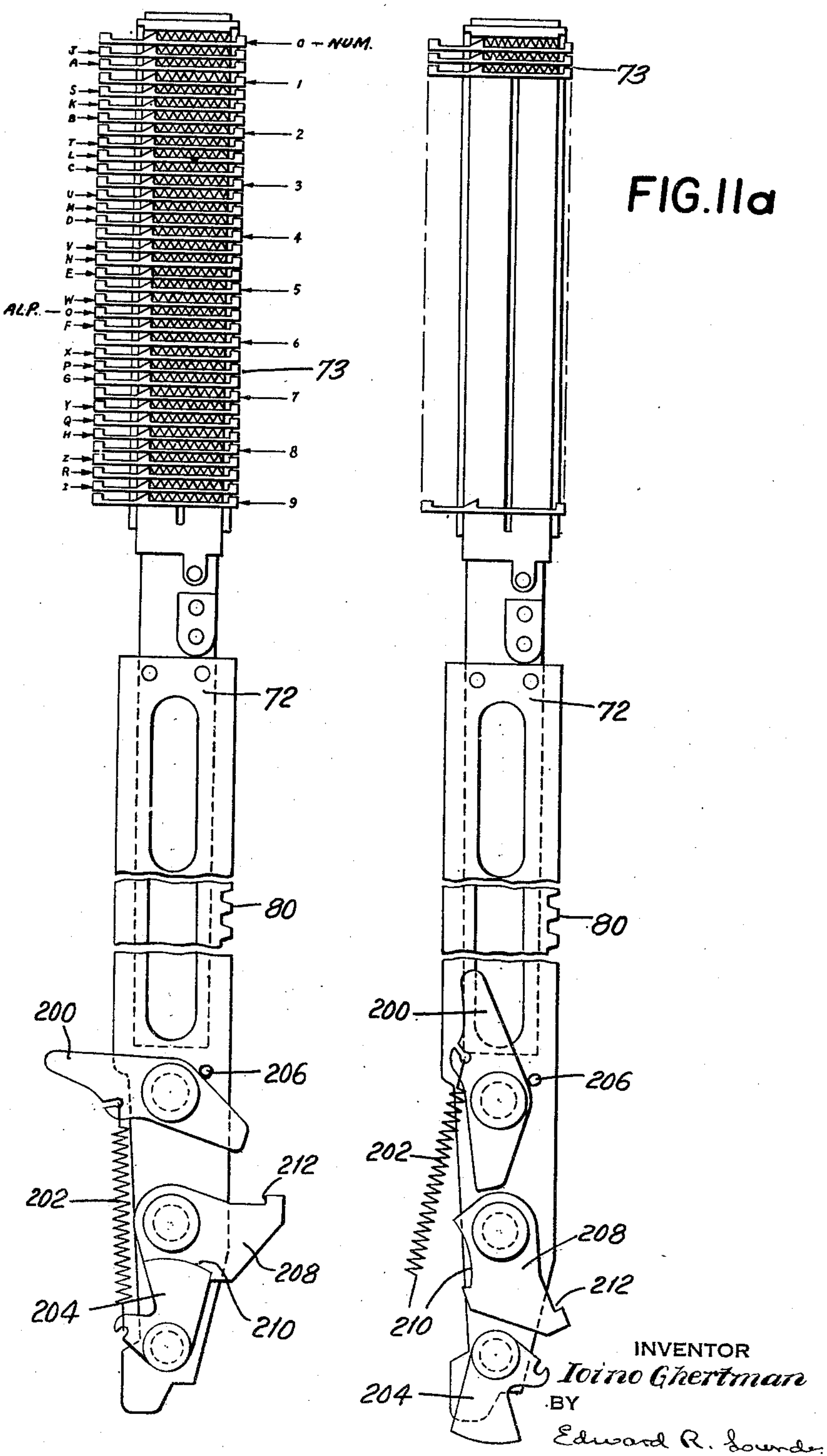
Fig. 11 is a fragmentary side elevational view of a type bar showing the arrangement of type thereon.

Fig. 11*a* is a side elevational view, similar to Fig. 11, showing the type bar with its various parts positioned for removal purposes.

Figure 12:
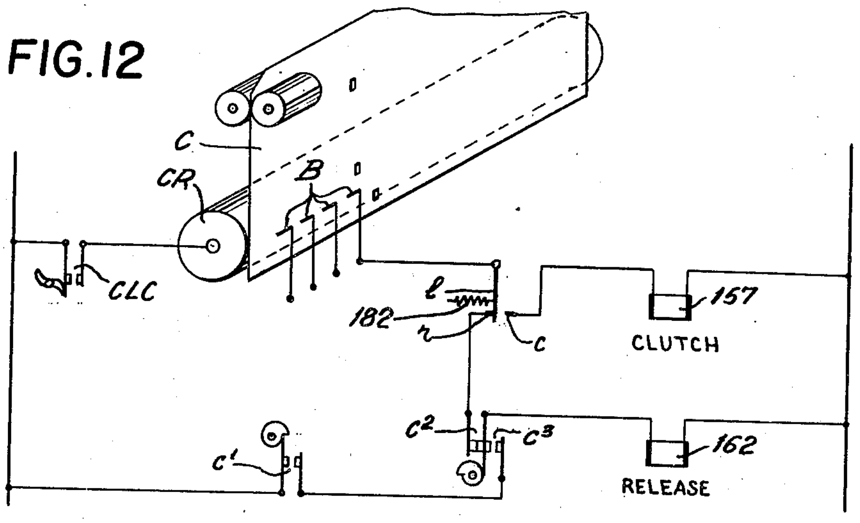

Fig. 12 is a circuit diagram showing the electrical connections for the type bar actuating mechanism comprising the present invention.

Figure 13:
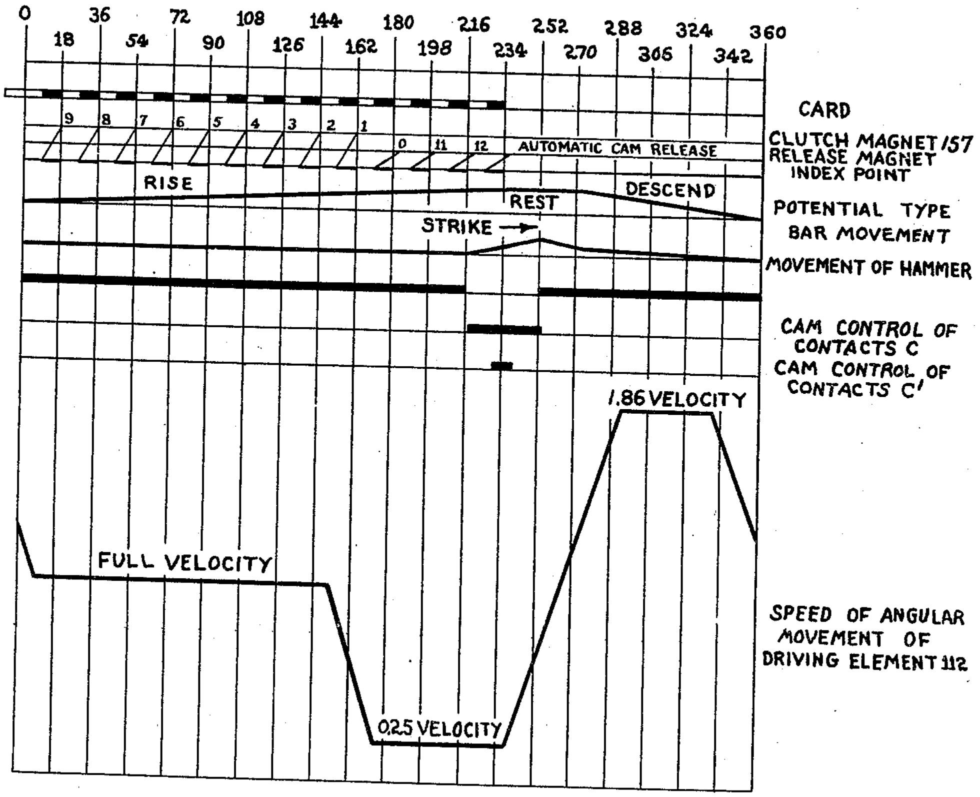

Fig. 13 is a timing chart representing the operation of the type bar actuating mechanism.

Figures 9, 14:
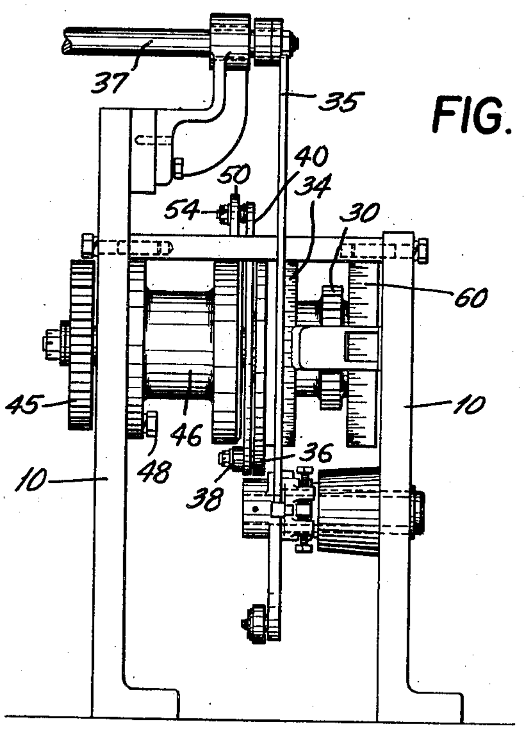
Fig. 9 is a fragmentary side elevational view of the structure shown in Fig. 1.
Figure 10:
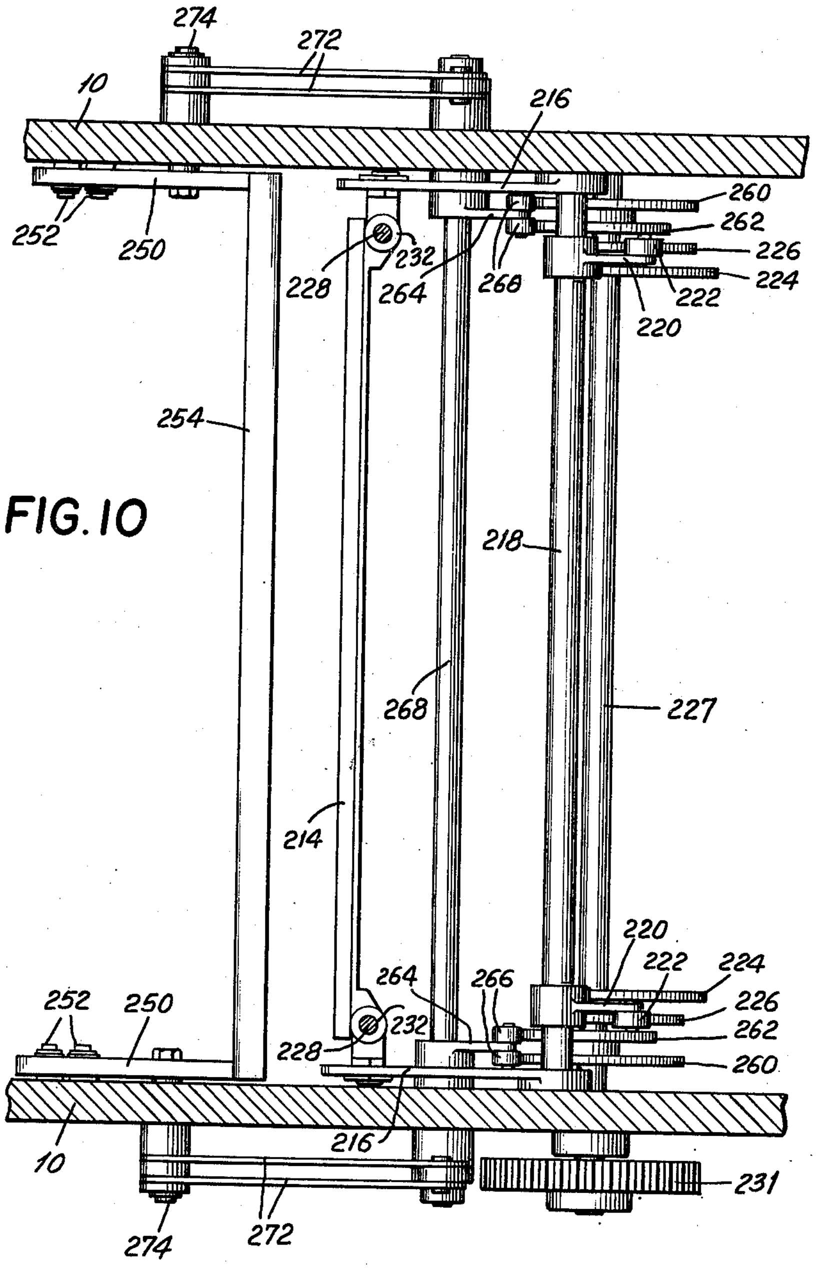
Fig. 10 is a sectional view taken substantially along the line 10—10 of Fig. 2.

Fig. 14 is a chart showing the Hollerith code employed in connection with the present invention.

In all of the above described views like characters of reference are employed to designate like parts throughout.

Figure 3:
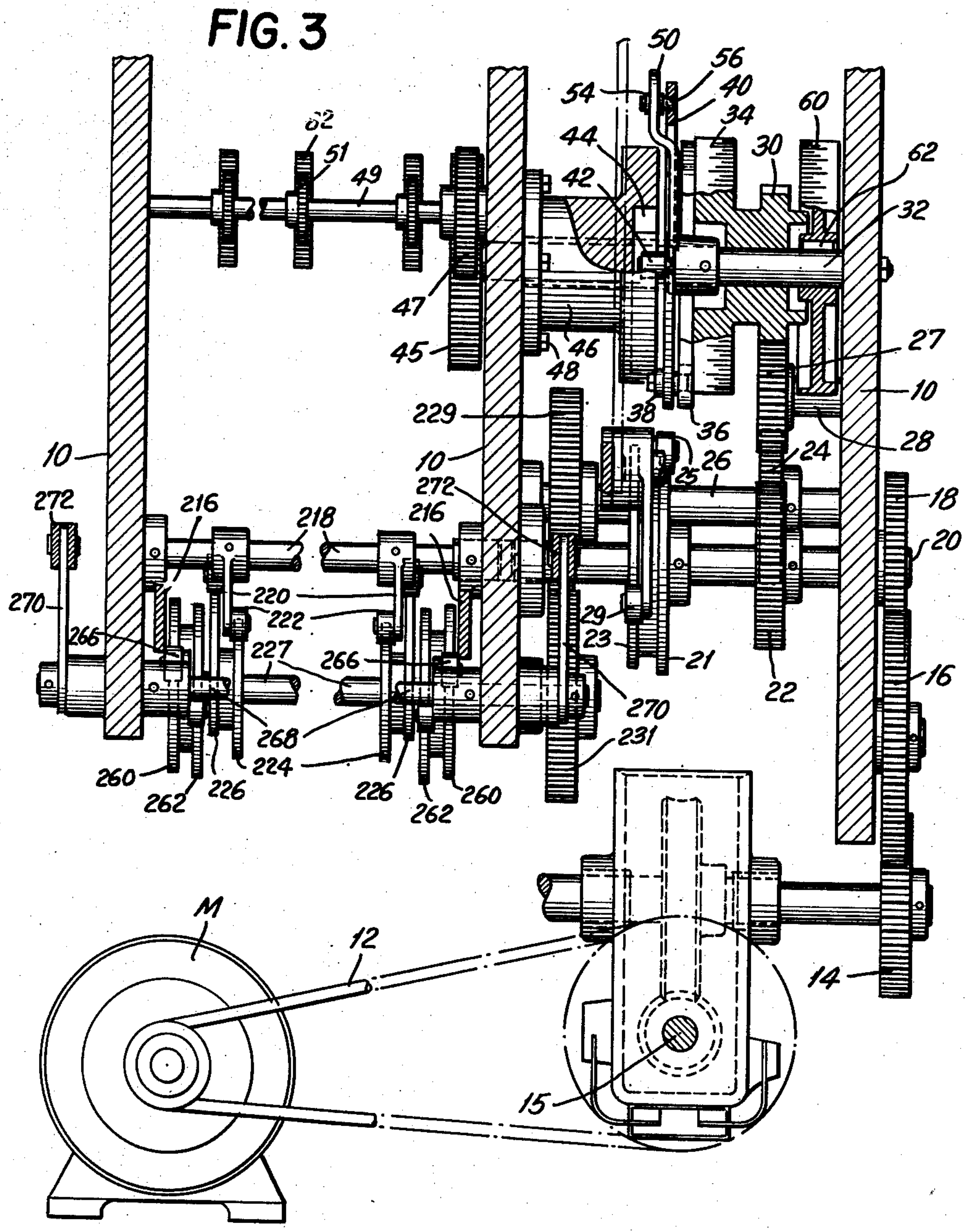
Fig. 3 is a sectional view taken substantially along the line 3—3 of Fig. 2.

Referring now to the drawings in detail, and particularly to Fig. 3, a portion of the tabulating machine framework is shown at 10 and includes a base plate 11 (Fig. 1) and side plates 13. This framework serves to support a motor M which serves, through a connecting belt and pulley arrangement 12 and gear reduction device 15, to drive all of the operating machine instrumentalities, including a train of gears 14, 16 and 18, the latter being carried at one end of a shaft 20 rotatably journaled in and extending across a portion of the machine framework 10. A gear 22 (Figs. 1 and 3) mounted on the shaft 20 meshes with a similar gear 24 carried on a shaft 26 journaled in the framework 10. The gear 24 meshes with a pinion 27 carried on a stub shaft 28 and the latter serves to drive a gear 30 which is loosely disposed on a shaft 32 journaled in the framework 10 and which has integrally formed therewith a calibrated ring member 34. The ring member 34 is formed with an ear 36 carrying an eccentric pin 38 on which there is pivoted a one-piece frame-like follower lever 40. The lever 40 is provided with a follower roller 42 which rides in a closed, generally heart-shaped cam groove 44 provided in a fixed or stationary block 46 (Fig. 9) secured to the framework 10 by means of studs 48.

A fork member 50 is keyed as at 52 to the shaft 32 and the bifurcated end thereof receives therein a block 54 pivotally mounted on a pin 56 carried near the free end of the frame-like lever 40.

The arrangement of parts described above constitutes a speed change mechanism whereby constant and uniform rotation of the driving gears 14, 16, 18, 22, 27 and 30 is translated into a variable speed rotation of the shaft 32 for the purpose of affecting the speed of rising movement of a series of type bars for a purpose and in a manner that will be made clear presently.

Figure 1:
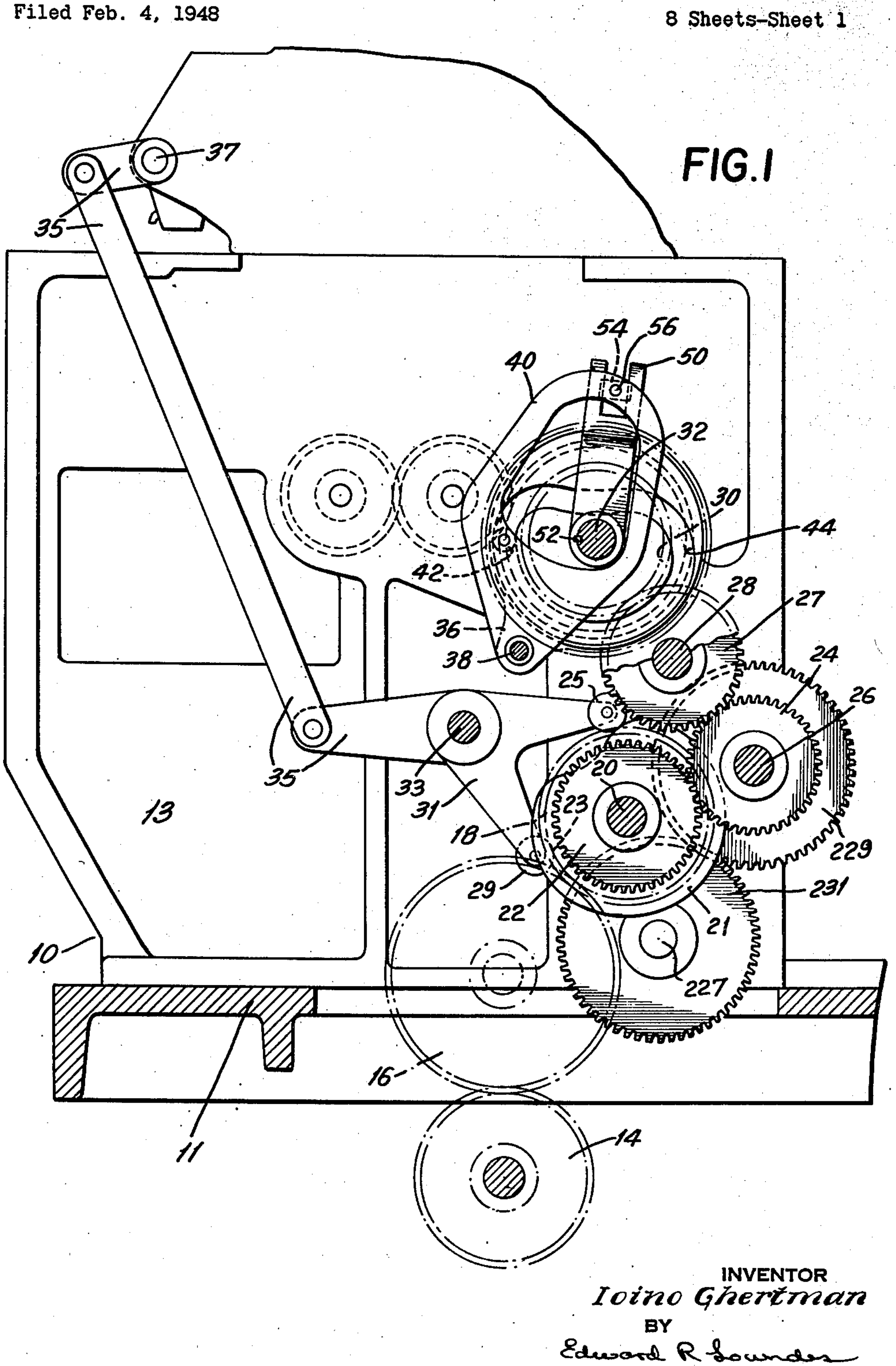
Fig. 1 is a side elevational view, partly in section, of a variable speed driving mechanism for the type bars of a tabulating machine constructed in accordance with the principles of the present invention.

It will be seen that as the gear 30, which is loosely disposed on the shaft 32, continues to rotate in a counter-clockwise direction, as viewed in Fig. 1, the frame-like lever 40 will be obliged to follow its movements and to likewise complete a counter-clockwise revolution each time the gear 30 completes a revolution. However, since the follower roller 42, which is mounted on the lever 40, is obliged to follow the fixed closed path provided for it by the groove 44 in the fixed member 46, the lever 40 will sweep back and forth over the face of the calibrated ring member 34 and gear 30 during its simultaneous rotation therewith and the free end thereof will, as a consequence, vary in its distance from the axis of the shaft 32, all in accordance with the character and shape of the fixed path provided by the cam groove 44. As a consequence of this, the block 54 will ride inwardly and outwardly in the bifurcated end of the fork member 50, thus imparting increments of acceleration and deceleration to the rotation of the latter and, consequently, to the rotation of the shaft 32. Specifically, the cam groove 44 is so designed according to engineering exigencies that during a relatively large portion of each revolution, the shaft 32 will rotate uniformly at a predetermined rate of speed and that during a relatively short portion of each revolution it will rotate uniformly at approximately one-fourth of its previous rate of speed. This variable speed of the shaft 32 is predicated upon the fact that the shaft is designed to actuate certain clutch mechanisms for driving the type bars of the tabulating machine upwardly, and in order to accommodate the principles of the present invention it is necessary that during a major portion of the ascending movement of the bars they travel at a high rate of speed and that during the remainder of their ascension they travel at one-fourth speed, all in a manner and for a purpose that will be adequately described hereinafter.

A second calibrated ring member 60 is fixedly secured as at 62 to the shaft 32 and the calibrations on the two members 34 and 60 may be employed for comparison purposes to gauge the change in speed of the shaft 32 relative to the gear 30.

The shaft 32 may be considered as the driving shaft or prime mover for the type bars inasmuch as the type bars are raised by the action of this shaft operating through a series of clutch driving devices, each of which is designated in its entirety at 70, and the details of which are best illustrated in Figs. 2 and 4 to 8, inclusive.

Figure 2:
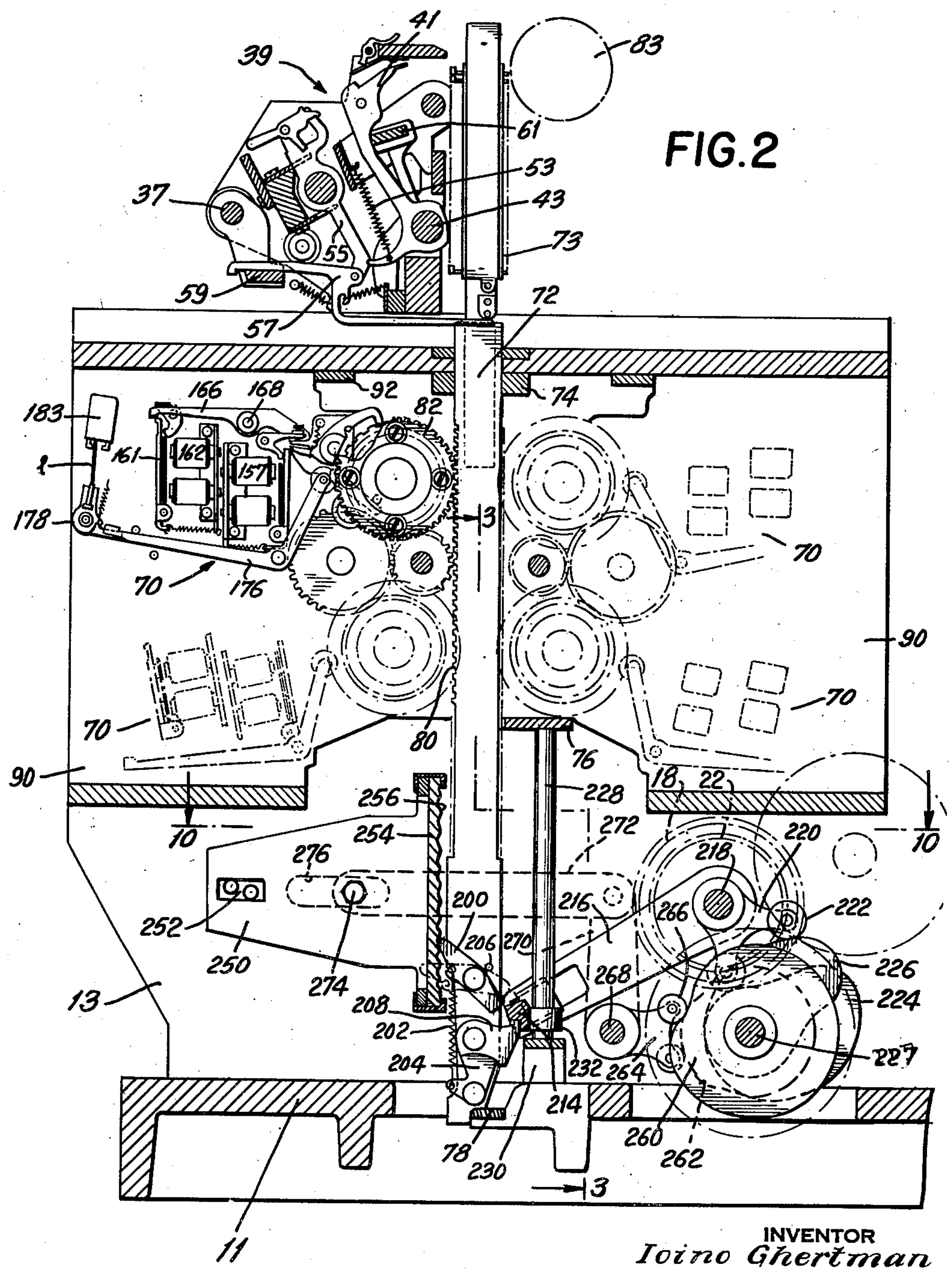
Fig. 2 is a transverse sectional view of the structure shown in Fig. 1 taken on a selected plane to disclose one of the type bars, its driving clutch mechanism and its restoring mechanism.

Referring now to Figs. 2, 11 and 11*a*, the type bars are designated in their entirety at 72 and have the usual reciprocable type elements 73 associated therewith. These bars are vertically disposed in the machine framework in parallelism and are guided in their upper and medial regions by comb-like structures 74 and 76 respectively. In their lowermost positions the lower ends of the type bars 72 are adapted to rest upon a dampening member 78 carried by the machine framework. Each type bar 72 is formed in the medial regions thereof with a toothed rack 80 designed for meshing engagement with the teeth provided on a type bar driving wheel 82 associated with one of the clutch driving devices 70.

The type bars 72 are arranged in adjacent pairs, the racks 80 on alternate pairs of bars being formed on the forward sides of the bars and the racks on other alternate pairs of bars being formed on the rear side of the bars. In other words, if the various type bars were, for identification purposes, to be numbered from left to right in the member from 1 to 80, inclusive, bars 1 and 2, 5 and 6, 9 and 10, etc., would be formed with the racks 80 on the forward side thereof, while bars 3 and 4, 7 and 8, 11 and 12, etc., would be formed with the racks 80 on the rear side thereof. This arrangement permits two of the clutch driving assemblies 70 to be mounted on an individual supporting plate 90 (Fig. 4) which, together with all of the operative driving instrumentalities mounted thereon, is capable of sliding movement into and out of the machine framework 10, suitable guides 92 being provided for insuring proper orientation and alignment of clutch driving devices 70 with their respective type bars 72.

Figures 4, 7, 8:
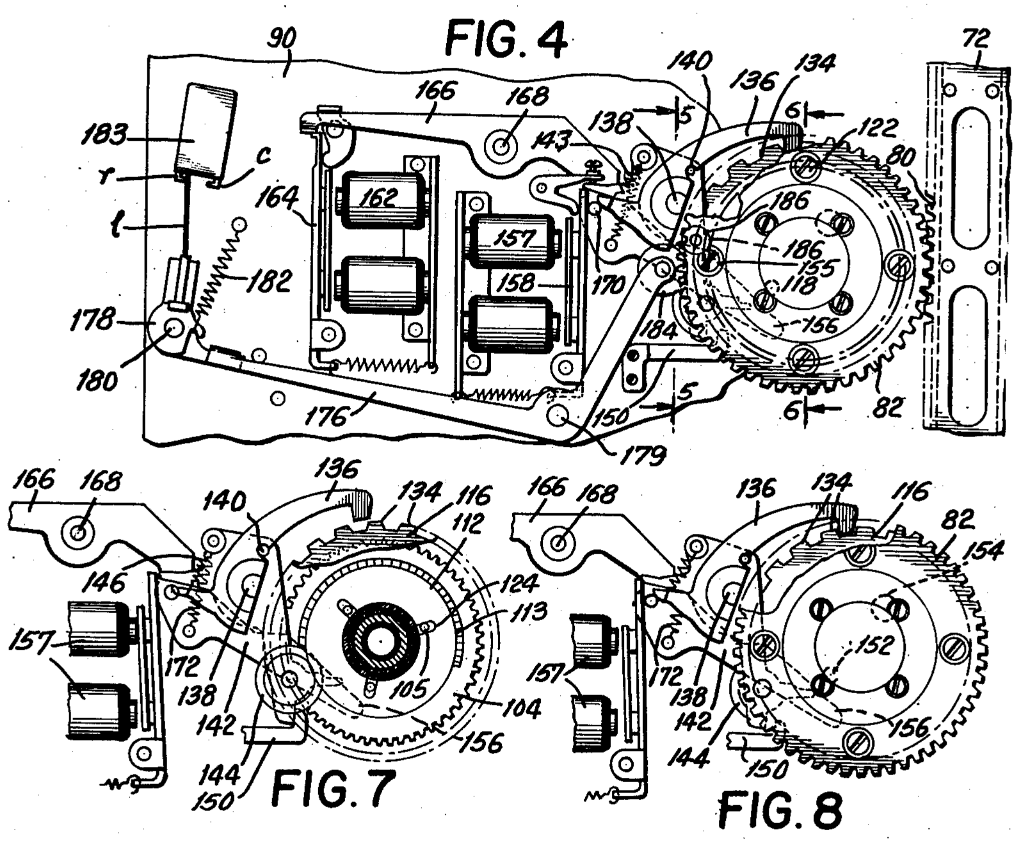
Fig. 4 is an enlarged fragmentary detail side elevational view of a clutch driving mechanism for one of the print bars, together with its electromechanical actuating mechanism.
Figs. 7 and 8 are fragmentary side elevational views of a portion of the driving clutch mechanism shown in Fig. 4 showing different operating positions of elements.
Figures 5, 6:
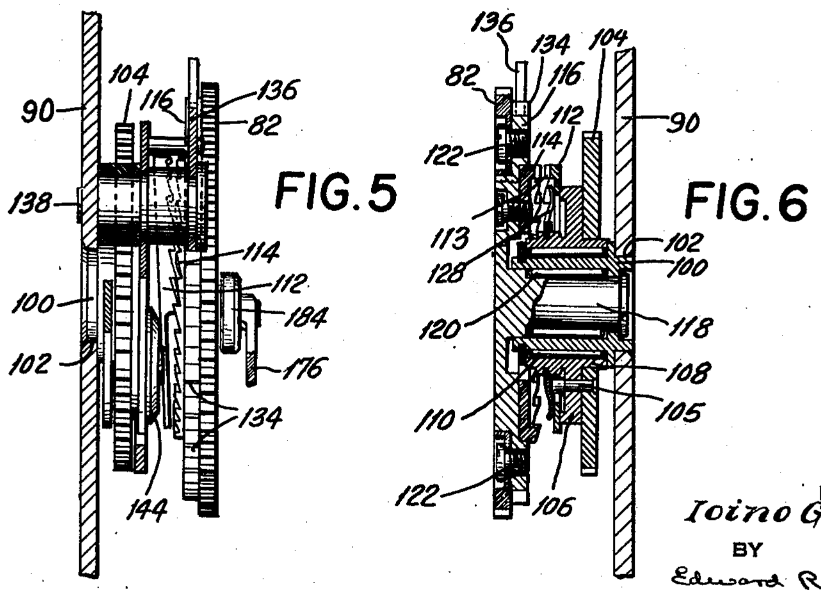
Fig. 5 is a sectional view taken substantially along the line 5—5 of Fig. 4.
Fig. 6 is a sectional view taken substantially along the line 6—6 of Fig. 4.

Referring now to Figs. 2 and 4 to 8 inclusive, and in particular to Figs. 5 and 6, each of the type bar clutch driving devices 70, of which there are two on each plate 90, includes a hollow stationary supporting shaft or sleeve 100 which is secured in an opening 102 formed in the plate 90 and which projects outwardly therefrom a short distance. A continuously rotating driving gear 104, whose rate of movement varies in accordance with the change in the rate of rotation of the shaft 32 (Fig. 3), is pinned or otherwise secured as at 105 to a radial flange 106 formed on a sleeve 108, the latter being rotatably journaled by means of antifriction bearings on the stationary shaft 100.

As stated above, the gear 104 is adapted to be continuously rotated at varying rates of speed in accordance with the variable movement of the shaft 32 and, toward this end, the shaft 32 projects through a portion of the framework 10 (Fig. 3) and has mounted thereon a gear 45 which meshes with a similar gear 47 carried on an elongated shaft 49. The shaft 49 has mounted thereon at spaced points therealong a series of gears 51, each of which meshes with one of the previously mentioned type bar driving wheels 82.

Returning now to Fig. 6, the sleeve 108 which carries the clutch driving gear 104 has secured thereto one element 112 of a clutch proper, the other element 114 thereof being mounted on a circular disc-like plate 116 having a hub 118 rotatably journaled by means of anti-friction bearings 120 in the stationary sleeve 100. The elements 112 and 114 are provided with a series of opposed clutch teeth 113 thereon. The previously mentioned type bar driving wheels 82 are in the form of ring gears which are secured by means of studs 122 to the circular plate 116. The studs 122 also serve to hold the element 114 of the clutch proper in position on the plate 116. The element 112 of the clutch proper (Fig. 7) is formed with a series of radial slots 124 therein into which the pins 105 extend. The element 112 is loosely mounted on the sleeve 108 and is capable of tilting movement relative thereto to permit the teeth thereon to engage the teeth of the driven element 114 of the clutch proper. A multi-blade leaf spring 128 serves to normally hold the element 112 against the radial flange 106 of the sleeve 108 and thus cause the clutch proper to remain disengaged. The clutch teeth 113 which are formed at the periphery of the clutch element 112 (Fig. 7) are removed around a portion of the periphery of the member and the existing teeth thereon extend a circumferential distance, which is slightly greater than 180°, for a purpose that will be made clear presently.

The periphery of the circular plate 116 is provided with a series of detenting teeth 134 thereon and the disc, and consequently the type bar driving wheel 82 and element 114 of the clutch proper which are attached thereto, are normally locked by a detenting arm 136 (Figs. 4, 7 and 8) whose free end rests between two adjacent teeth 134 and affords a positive restraint against movement of the wheel in either direction. The arm 136 is pivoted on a stud 138 and has an open pin and slot connection 140 with the supporting arm 142 of a beveled disc 144. A spring 146 connected between the detenting arm 136 and supporting arm 142 serves to hold the former arm in engagement with the teeth 134 of the disc-like plate 116.

From the above description of parts it will be seen that rocking of the supporting arm 142 in a counter-clockwise direction will serve to bring the beveled edge of the disc 144 into tractional and camming engagement with the element 112 of the clutch proper, thus tilting this element so that a limited peripheral toothed region thereof will engage an equal peripheral toothed region of the clutch element 114 to drive the latter. Obviously, when the beveled disc 144 travels over the circumferential region of the clutch element 112, which is devoid of teeth, no effective engagement of the two clutch elements will occur and the element 112 will continue to rotate without function until such time as the beveled disc 144 again approaches the toothed peripheral region of this element.

The proportioning of the parts just described is such that engagement of the driving and driven clutch elements 112, 114 is effected before the detenting arm 136 is fully disengaged to insure that the circular disc-like plate 116 is controlled either by the detenting arm or by the clutch element 112. With the clutch engaged, the parts assume the position shown in Fig. 7, with the supporting arm 142 bearing against a fixed stop 150 suitably secured to the supporting plate 90. The parts will remain in this position to drive the clutch element 114, circular disc-like plate 116 and type bar driving wheel 82 until the arm 142 is again rocked clockwise to its original position. This may be effected under the influence of one or the other of two substantially diametrically opposed cam rollers 152 and 154, which are adapted to engage an extension 156 on the arm 142 in passing, upon rotation of the driving assembly including the clutch element 112, sleeve 108 and driving gear 104. For purposes that will be set forth subsequently, the diameter of the roller 154 is greater than the diameter of the roller 152.

The cooperating teeth 113 on the two clutch elements 112 and 114 have their driving edges slightly inclined to a line parallel to the axes of these elements so that with the beveled disc 144 withdrawn from clutching position and the circular plate 116 locked against rotation, the further driving movement of the element 112 will cause the clutch to be cammed out of engagement and held there by the multi-blade leaf spring 128.

The initial rocking of the arm 142 is controlled by a pair of magnets 157 which, upon energization thereof, attract their armature 158 to release a lateral extension 160 of the arm 142, whereupon a biasing spring 143 will rock the arm 142 in a counter-clockwise direction to cause the beveled disc 144 to move into engagement with the peripheral edge of the clutch element 112. By virtue of the pin and slot connection 140 and the spring 146, the detenting arm 136 will likewise be rocked in a counter-clockwise direction and thus this arm will be freed from engagement with the detenting teeth 134 formed on the periphery of the circular disc-like plate 116.

A second pair of magnets 162 is provided which acts on its armature 164 to release a lever 166 which is pivoted as at 168 to the plate 90. The lever 166 carries a pin 170 which, when the lever is released, will be moved upwardly by means of a spring 172 to engage and rock the arm 142 in a clockwise direction. It will thus be seen that the driven element of the clutch assembly, including the type bar driving wheel 82, may be clutched to the driving clutch element 112 when the magnet 157 is energized and declutching will take place upon energization of the magnet 162 or under the mechanical action of the two cam rollers 152 and 154. A cam roller 155 is mounted on the driving gear 104 near the periphery thereof and operates at the end of the machine cycle to restore the lever 166 to its latched position.

Referring now to Figs. 4 and 12, a contact operating lever 176 is pivoted on a stud 179 carried by the plate 90 and one end thereof is adapted to bear against one end of a contact carrying bell crank lever 178 pivoted on a stud 180. The other arm of the bell crank lever 178 carries a pivoted contact arm *l* and the lever is normally biased by a spring 182 in a counter-clockwise direction wherein the contact arm *l* engages a contact *r* carried in an insulating block 183. Also carried in the insulating block 183 is a contact *c* designed for engagement by the contact arm *l* when the bell crank lever 178 is moved in a counter-clockwise direction under the influence of the lever 176. The lever 176 carries a roller 184 designed for engagement with a cam roller 186 mounted on the circular disc-like plate 116. As will be described when consideration is given to the operation of the machine, as illustrated in the circuit diagram of Fig. 12, the roller 184 bears against the cam roller 186 only when the corresponding type bar 72 is in its lowermost position of rest and in such a position a circuit will be completed through the contact arm *l*, contact *c*, to the clutch magnet 157. Immediately upon movement of the type bar upwardly away from its home position the roller 186 will move away from the roller 184, thus allowing the lever 176 to be moved in a clockwise direction and causing the contact arm *l* to be shifted into engagement with the contact *r* under the influence of the spring 182. In this latter position of the contact arm *l*, a circuit will exist to the release magnet 162.

Referring now to Fig. 11, wherein one of the type bars 72 is shown, the superimposed arrangement of the reciprocable type elements 73 thereon is as illustrated. In the present embodiment of the invention there are thirty-six type elements, of which twenty-six are alphabetical elements and ten are numerical elements. These thirty-six type elements may, for descriptive purposes, be said to be divided into nine groups of four adjacent type elements each. The groups are as follows, reading from top to bottom: 0 (zero), J, A, 1; S, K, B, 2; T, L, C, 3; U, M, D, 4; V, N, E, 5; W, O, F, 6; X, P, G, 7; Y, Q, H, 8; Z, R, I, 9.

It is to be noted that, with one exception, each of these groups consists of three upper alphabetical characters and a lowermost numerical character with the numerical characters proceeding in numerical sequence from the top to the bottom group. The single exception resides in the fact that the zero numerical type bar element is placed at the top of the first group.

The record cards are fed past the analyzing station with the 9 index point position leading and, until such time as a perforation is encountered by the analyzing brush, no impulse is applied to the clutch magnet 157 and, as a consequence, the clutch elements 112, 114 (Fig. 6) are not engaged. During passage of the numeric portion of the record card through the analyzing station, the driving clutch member 112 is rotated, as previously described, and is moved at a relatively fast rate of rotation. As soon as a perforation in the numeric section of the card is encountered, an impulse is sent to the magnet 157 whereupon it attracts its armature 158 and releases the arm 142 to permit the beveled disc 144 to move into engagement with the clutch element 112 and cause engagement of the clutch proper to thus drive the clutch element 114 and, consequently, the type bar driving wheel 82. At the same time the detenting arm 136 moves out of engagement with the teeth 134 on the circular disc-like plate 116 and the type bar commences to rise. Immediately after movement of the type bar has commenced, the roller 186 moves away from the roller 184 and the contact arm $l$ moves into engagement with the contact $r$ so that any future electrical impulse arising by virtue of a perforation in the zone section of the record card being encountered will be transmitted to the release magnet 162 to disengage the clutch proper and restore the detenting arm 136 to arrest the movement of the type bar and to effect alignment of the selected type element 73 with the printing line of the platen.

If, for example, the card contains a perforation in the 4 index point position of the numeric section of a card column, and also a perforation in the 12 index point position of the zone section of the card column, it will be understood that the letter D is to be printed for this combination (see Fig. 14). After the card reaches the analyzing station the 9, 8, 7, 6 and 5 index point positions will be analyzed without detecting the presence of a perforation. When the 4 index point position is encountered, a perforation will be present and an impulse will be sent to the magnet 157, thus causing engagement of the clutch 112, 114 and immediate rotation of the type bar driving wheel 82. Since the numeric section of the card is undergoing analysis at this time, the driving gear 104 will be turning at a relatively fast rate and the type bar will rise rapidly while the 3, 2 and 1 index point positions are being analyzed. The rate of rotation of the driving wheel 82 at this time is such that for each index point position analyzed in the numeric section of the card one group of four types each will pass the printing line and thus when the zone section of the card column is presented for analysis, the type bar will have risen to such an extent that the third group of type elements, namely, the T, L, C, 3 group, will have passed above the printing line. Since the zone section of the card column will then be under analysis, the speed of rotation of the driving gear 104 will have slowed down to approximately one-fourth its original speed and during analysis of the 0 index point position, the U character will pass the printing line. During analysis of the 11 index point position, the M character will pass the printing line, and when analysis of the 12 index point position, which contains a perforation, occurs, an impulse will be sent to the release magnet 162 to stop the type bar in such a position that the D character is in register with the printing line.

Still considering the example given above for printing the letter D, if the perforation in the zone section of the card column had occurred in the 11 index point position, it is obvious that the letter M would have arrived for printing purposes at the printing line and that if the perforation existed in the 0 index point position the letter U would have been presented for printing. If, on the other hand, no perforation whatsoever appeared in the zone section of the card the numeral 4 would have been presented for printing, inasmuch as during zone analysis no impulse would be applied to the release magnet and at a point in the machine cycle approximately 18° beyond the analysis of the 12 perforation an impulse would have been applied to the release magnet through a circuit existing by virtue of the closure of a pair of contacts designated at $cl$ in Fig. 12 in a manner that will be made clear when a discussion of this figure is undertaken.

It follows from the above description that whenever a preforation is encountered at the analyzing station in a numeric section of a card column the corresponding type bar will commence to rise at a rapid rate of speed and four type elements will pass the printing line for each remaining numeric index point position yet to be analyzed. Then, unless a zone perforation is encountered in the zone section of the card column at a point approximately 18° in the machine cycle beyond analysis of the 12 index point position, the type bar will be brought to rest with a numeric type element in register with the printing line. If, on the other hand, a zone perforation is encountered the type bar will be stopped at the appropriate position for register of the selected alphabetic type with the printing line. Where the numeral 9 is to be printed, a perforation will be presented to the analyzing brush at the outset of the analyzing operation and the type bar will rise rapidly until eight groups of four type elements each (i.e., thirty-two type elements) have passed the printing line. The type bar will then slow down and three more type elements, namely, the Z, R and I elements will pass the printing line before the automatic energization of the release magnet 162 occurs to stop the 9 type on the printing line.

The zero type element is positioned as the uppermost element in the series. It is represented in the code of Fig. 14 by the presence of a perforation in the 1 index point position of the numeric section of the card column and a perforation in the 0 index point position of the zone section of the column. Thus, the record cards will pass through the analyzing station and the type bar will not commence to rise until the perforation is encountered at the 1 index point position. Immediately upon energization of the clutch magnet 157, the speed of rotation of the driving clutch assembly is reduced to one-fourth its initial speed and, as a consequence, the type bar will have been displaced the only 1 type at the time the 0 perforation is encountered in the zone section of the column to energize the release magnet 162 and stop the type bar.

The printing mechanism is illustrated in Fig. 2 and the means for operating it appears in Fig. 1. This mechanism is more or less conventional in its design and no claim is made herein to any novelty associated therewith. Briefly, the shaft 20 has mounted thereon a pair of complementary cams 21 and 23, which cooperate with respective follower rollers 25 and 29 mounted on a cam follower 31 secured to a rock shaft 33. The rock shaft 33 is connected through a linkage system 35 to the bail supporting shaft 37 (Figs. 1 and 2) of a printing hammer control assembly designated in its entirety at 39. The printing hammer control assembly 39 is of the type shown in the patent to Peirce, No. 2,042,324, dated May 26, 1936, for a Tabulator, and reference may be had to this patent for a detailed description of such a mechanism. In the present mechanism the printing hammers 41 are mounted on a common shaft 43 and are spring pressed as at 53 for performance of the printing action. The hammers are normally locked against such printing action by latches 55 which pivotally carry levers 57 designed when depressed for cooperation with a bail 59 mounted on the shaft 37. The shaft 43 carries a restoring bail 61. As the restoring bail 61 approaches its right-hand position the linkage system 35 causes clockwise rotation of the shaft 37 to move the bail 59 to the left so that if the hooked ends of any of the levers 57 are in cooperation with the bail 59 the corresponding latches 55 will be moved to the left to release the hammers whereupon the latter will be actuated by their springs 53 to impinge upon the type elements 73 for printing purposes.

Referring now to Figs. 2, 10, 11 and 11*a*, wherein the restoration mechanism for bringing the type bars back to their home position of rest is illustrated, each type bar 72 has pivotally mounted thereon a pivoted latch member 200 which is connected by means of a coil spring 202 to a pivoted locking member 204, the spring 202 serving to bias the member 200 in a counter-clockwise direction and the member 204 in a clockwise direction. A stop pin 206 determines the normal position of the spring 202, this position being such that the opposite ends thereof project outwardly a short distance beyond the confines of the type bar on opposite sides thereof. A third pivoted member 208 is mounted on the type bar immediately above the member 204 and below the member 200 and is provided with a cut-away portion 210 designed for engagement with the free end of the locking member 204. The members 204 and 208 normally assume the positions shown in Fig. 11 and they remain in these positions at all times during operation of the machine. In such position, the member 208 projects outwardly beyond the confines of the type bar and is provided with a shoulder 212 designed for engagement with a restoring bail 214 (Fig. 2). The restoring bail 214 is commensurate in extent with the series of type bars 72 and is common to and spans the same. This bail 214 is slidably carried at opposite ends by a pair of bifurcated bail arms 216 secured to a bail shaft 218 having associated therewith a follower yoke 220 carrying follower rollers 222 designed for engagement with a pair of complementary cams 224 and 226 mounted on a shaft 227 journaled in the framework 10, these cams being so designed as to impart an oscillatory movement to the bail arms 216. The shaft 227 is adapted to be driven from the shaft 26 by means of a pair of gears 229 and 231 (Fig. 3). A pair of vertical guide rods 228 (Figs. 2 and 10) extend between the comb-like member 76 and a bracket 230 mounted on the base plate 11 and the opposite ends of the bails are provided with guide sleeves 232 which slide upon the guide rods 228, thus causing the bail to reciprocate vertically as the bail arms 216 oscillate. The movement of the bail arms 216, as determined by the contours of the complementary cams 224, 226, is regulated in such a manner that the bail 214 approaches its limit of upward movement when the record card moves into position at the analyzing station. During analysis of the card and during the printing cycle when the printing hammers 41 are actuated, the bail 214 completes its upward movement and immediately thereafter, after the hammers strike the type element 73, the bail commences its downward movement engaging successively the type bars which have reached their highest elevations.

With respect to each type bar, the bail 214 first engages the projecting portion of the latch 200 and the latch is moved aside to permit the bail to strike the shoulder 212 of the member 208, the latter being held rigidly by the locking member 204. The type bar is then set into motion and the latch 200 springs back to its latching position above the bail so that the type bar is thus constrained to follow the downward movement of the bail until it is deposited upon the dampening element 78.

Referring now to Fig. 2, a pair of plates 250 are slidably mounted on the sides of the machine framework 10 and are guided in their horizontal sliding movements by pin and slot connections 252. Extending across the machine and spanning the distance between the plates 250 is a braking plate 254 having a corrugated face 256 designed for cooperation with the projecting end of the latch member 200 in a manner that will be described presently.

The horizontal movements of the braking plate 254 toward and away from the type bars is controlled by means of a pair of complementary cams 260 and 262 mounted on the shaft 227 and having associated therewith a follower 264 with follower rollers 266 carried thereby. The follower 264 is mounted on a rock shaft 268. A pair of arms 270 secured to the shaft 268 are pivotally attached to connecting rods 272 at one end of the latter and the other ends of the connecting rods are connected by means of pins 274 which project through slots 276 formed in the side plates 13 of the machine to the other ends of the connecting rods 272. The complementary cams 260 and 262 are so designed that immediately prior to actuation of the printing hammers 41 the braking plate 254 will approach the type bars and come to rest at a position slightly spaced therefrom wherein the projecting ends of the latch members 200 bear against the corrugated face 256 thereof. In this position of the braking plate 254 the latch members 200 are not appreciably moved from their extended position but they are engaged with sufficient force, however, as to maintain a degree of friction between the type bars and the braking plate so that no one particular type bar will interfere with the downward movement of its neighbor. The braking plate thus serves to prevent dropping of the type bars upon disengagement of the type bar driving wheel 82 from the type bars. After the type bars have all reached their positions of rest the braking plate 254 is caused, by means of its controlling cams, to move still closer to the type bars so as to cause the latch member 200 to be moved in a clockwise direction to free the bail 214 and permit its upward movement without disturbing the position of rest of the type bars. In Fig. 11*a*, the various pivoted members 200, 204 and 208 are shown as being so positioned that the type bar 72 may be readily removed from the machine. To attain this position of the members, it is necessary to disengage the spring 202 from the pivoted locking member 204 and to manually move the three movable elements to a position where they occupy a position substantially wholly within the confines of the type bar.

Referring now to Fig. 12 wherein the electrical diagram for the printing mechanism of the tabulating machine is shown, and also referring to Figs. 11 and 14, if it is assumed that a numerical character, such as the numeral 5 for example, is to be printed by virtue of a perforation in the 5 index point position of the numeric section of a particular card column after the card C enters the analyzing station, the analyzing brush B analyzes the 9, 8, 7 and 6 positions before any motion of the type bar occurs. When the brush encounters the 5 position a circuit is completed from one side of the line through the usual card lever contacts CLC which remain closed only during the presence of a card in the analyzing station, contact roll CR, brush B, contact arm $l$, contact $c$, and clutch magnet 157 to the other side of the line. Energization of the clutch magnet causes engagement of the clutch proper 112, 114 and release of the driving wheel 82 by the detenting arm 136 in the manner previously described and the type bar is accordingly moved upwardly. During analysis of the 4, 3, 2 and 1 index point positions, the first four groups of four type elements each will pass the printing line and, as zone analysis commences, the speed of movement of the type bar will be reduced to one-fourth its original speed so that during analysis of the 0, 11 and 12 index point positions the type elements representing the letters U, M, N, D will pass the printing line. Approximately 13° after analysis of the 12 perforation the type bar will stop by virtue of the fact that at approximately 1° after analysis of the 12 index point position a pair of normally closed contacts $c2$ become open and a pair of normally open contacts $c3$ become closed. Additionally, at approximately 18° after the analysis of the 12 index point position the pair of normally open cam controlled contacts $c1$ become closed thus permitting current to flow from one side of the line through the contacts $c1$, $c3$ and release magnet 162 to the other side of the line. The type element representing the numeral 5 thus arrives at the printing line and is positively held against dislodgement at approximately 18° in the machine cycle after analysis of the 12 perforation. It has been seen above how the bringing of a numerical type element into alignment with the printing line is always effected by means of energization of the release magnet 162 at a definite point in the machine cycle. It will now be shown how the release magnet 162 is selectively operated according to the arrangement of perforations in the card column for printing an alphabetic character.

If, for example, it is desired to print the alphabetic character U which is represented by a perforation in the 1 index point position of the numeric zone of the column and a perforation in the 11 index point position of the zone section of the column no perforation will be encountered by the analyzing brush B until the brush has analyzed all nine of the numeric index point positions and has encountered a perforation in the 1 index point position. All during this time the type bar will remain stationary and immediately upon analysis of this 1 perforation the type bar will commence to rise. It will rise, however, at its slow rate of speed because by the time it has commenced to travel upwardly the analyzing brush is engaged in analyzing the zone section of the cord. When the 11 index point position is presented for analysis the type bar has been displaced by two type widths and the letter J is presented to the printing line. As soon as the perforation in the 11 position is encountered a circuit will exist from one side of the line through card lever contacts CLC, contact roll CR, brush B, contact arm $l$, contact $r$ (now closed), contacts $c2$ (also closed) and release magnet 162 to the other side of the line. The arm $l$ and contact $r$ are in engagement by virtue of the fact that the position of the arm $l$ shifts from the contacts $c$ as soon as a type bar commences its upward motion.

While there have been shown and described and pointed out the fundamental novel features of the invention as applied to a prefered embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a cyclically operable record controlled machine, a plurality of type bars movable vertically from lowered inoperative positions of rest to operative elevated printing positions, a driving clutch assembly for each type bar including a freely rotatable driven element and a constantly rotatable driving element, means establishing permanent tractional driving engagement between the driven element and said type bar whereby rotation of the former in one direction will cause elevation of the latter, means normally rotating said driving element at a predetermined rate of speed, means operable at a fixed point in the machine cycle for reducing the rate of speed of said driving element, locking means normally holding said driven element in any one of the rotative positions thereof and against rotation in either direction, record controlled means called into action at differential times in the machine cycle prior to reduction in speed of the driving element for removing said locking means and concurrently effecting clutching engagement between the driving element and the driven element to effect initial elevation of the type bar, and record controlled means operable during a portion of the machine cycle when said driving element is rotating at a reduced rate of speed for causing unclutching of the driving and driven elements and engagement of the locking means thus leaving the driven element locked and, as a consequence, the type bar elevated to a position advanced from its initial position by an amount determined by the differential time of clutching engagement between said elements.

2. In a cyclically operable record controlled machine, a plurality of type bars movable vertically from lowered inoperative positions of rest to operative elevated printing positions, a driving clutch assembly for each type bar including a freely rotatable driven element and a constantly rotatable driving element, means establishing permanent tractional driving engagement between the driven element and said type bar whereby rotation of the former in one direction will cause elevation of the latter, means normally rotating said driving element at a predetermined rate of speed, means operable at a fixed point in the machine cycle for reducing the rate of speed of said driving element, locking means normally holding said driven element in any one of the rotative positions thereof and against rotation in either direction, record controlled means called into action at differential times in the machine cycle prior to reduction in speed of the driving element for removing said locking means and concurrently effecting clutching engagement between the driving element and the driven element to effect initial elevation of the type bar, record controlled means operable during a portion of the machine cycle when said driving element is rotating at a reduced rate of speed for causing unclutching of the driving and driven elements and engagement of the locking means thus leaving the driven element locked and, as a consequence, the type bar elevated to a position advanced from its initial position by an amount determined by the differential time of clutching engagement between said elements, and means operable at a fixed time in the operation of the machine for causing such unclutching of the elements and engagement of the locking means in the absence of any previous unclutching and locking action by said second mentioned record controlled means.

3. In a cyclically operable record controlled machine, a plurality of type bars movable vertically from lowered positions of rest to elevated printing positions, said bars each being formed with an elongated vertically extending rack portion medially thereof, a driving clutch assembly for each type bar including a freely rotatable driven element and a constantly rotatable driving element, said driven element having a series of circumferentially arranged teeth thereon meshing with the rack on the type bar, locking means normally holding said driven element in any one of the rotative positions thereof and against rotation in either direction, record controlled means called into action at differential times for removing said locking means and concurrently effecting clutching engagement between the driving element and the driven element, means operable at a fixed time in the operation of the machine for causing unclutching of the driving and driven elements and engagement of the locking means, thus leaving the driven element locked and the type bar elevated in a position advanced from its initial position by an amount determined by the differential time of clutching engagement between said elements, and means operable at the commencement of each machine cycle for rotating said driving element at a predetermined constant rate of speed and operable at a point later in the cycle for reducing the rate of speed of said driving element.

4. In a record controlled machine, a plurality of type bars movable vertically from lowered inoperative positions of rest to operative elevated printing positions, a driving clutch assembly for each type bar including a freely rotatable driven element and a constantly rotatable driving element, means establishing permanent tractional driving engagement between the driven element and said type bar whereby rotation of the driven element in one direction will cause elevation of the type bar, said driving and driven elements being arranged in coaxial relationship and each having a series of teeth with the teeth on each member being opposed to the teeth on the other member, spring means normally holding said members apart with the teeth thereon in parallel planes, and means for changing the angle between said series of teeth to effect engagement at a point of intersection created by the change in angle, said last named means causing the members to be locked in engagement whereby motion is transmitted from said driving element to said driven element, and means for positively interrupting the movement of said driven element and for simultaneously causing disengagement of said teeth to maintain said type bar at a predetermined degree of elevation.

5. In a cyclically operable tabulating machine of the character described, a type bar having a row of superimposed type elements mounted thereon, said bar being movable vertically from a lowered position of rest to an elevated printing position wherein a selected type element thereon is brought into register with the printing line, said type elements being arranged in superimposed groups of four type elements each, the three uppermost type elements of each group being provided with alphabetic type thereon and the lowermost type element of each group being provided with a numeric type thereon, record controlled means capable of being called into action at differential times for initiating vertical movement of the type bar at a predetermined rate of speed to cause said type elements to pass the printing line in succession, means automatically operable at a predetermined point in the machine cycle for decreasing the rate of upward movement of the type bar whereby the time of initial movement of the latter will serve to effect group selection of the type elements, record controlled means capable of being called into action at differential times after the speed of the type bar has been decreased for interrupting the movement of the type bar and positively locking the same against movement in either direction whereby such locking action effects selection of an alphabetic type within the previously selected group, and means automatically operable at a point near the end of the machine cycle for effecting such locking action in the absence of any previous locking action whereby such latter locking action effects selection of the numeric type within the previously selected group of type elements.

6. In a cyclically operable tabulating machine of the character described, a type bar having a row of superimposed type elements mounted thereon, said bar being movable vertically from a lowered position of rest to an elevated printing position wherein a selected type element thereon is brought into register with the printing line, said type elements being arranged in superimposed groups of four type elements each, the three uppermost type elements of each group being provided with alphabetic type thereon and the lowermost type element of each group being provided with a numeric type thereon, record controlled means capable of being called into action at differential times for initiating vertical movement of the type bar at a predetermined rate of speed to cause the type elements thereon to pass the printing line in succession, means automatically operable at a predetermined point in the machine cycle for decreasing the rate of upward movement of the type bar whereby the time of initial movement of the latter will serve to effect group selection of the type elements, and record controlled means capable of being called into action at differential times after the speed of the type bar has been decreased for interrupting the movement of the type bar and positively locking the same against movement in either direction whereby such locking action effects selection of an alphabetic type within the previously selected group.

7. In a cyclically operable tabulating machine of the character described, a type bar having a row of superimposed type elements mounted thereon, said bar being movable vertically from a lowered position of rest to an elevated printing position wherein a selected type element thereon is brought into register with the printing line, said type elements being arranged in superimposed groups of an equal number of type elements each, record controlled means capable of being called into action at differential times for initiating vertical movement of said type bar at a predetermined rate of speed to cause the type elements thereon to pass the printing line in succession, means automatically operable at a predetermined point in the machine cycle for decreasing the rate of upward movement of said type bar, and record controlled means capable of being called into action at differential times at a later point in the machine cycle for interrupting the movement of said type bar and positively locking the same against movement in either direction.

8. In a cyclically operable tabulating machine of the character described, a type bar having a row of superimposed type elements mounted thereon, said bar being movable vertically from a lowered position of rest to an elevated printing position wherein a selected type element thereon is brought into register with the printing line, said type elements being arranged in superimposed groups of an equal number of type elements each, record controlled means capable of being called into action at differential times for initiating vertical movement of said type bar at a predetermined rate of speed to cause the type elements thereon to pass the printing line in succession, means automatically operable at a predetermined point in the machine cycle for decreasing the rate of upward movement of said type bar, record controlled means capable of being called into action at differential times at a later point in the machine cycle for interrupting the movement of said type bar and positively locking the same against movement in either direction, and means automatically operable at a point near the end of the machine cycle for interrupting the movement of said type bar and positively locking the same against movement in either direction in the absence of any previous locking action by said record controlled means.

IOINO GHERTMAN.

REFERENCES CITED

The following references are of record in the file of this patent:

UNITED STATES PATENTS

| Number | Name | Date |
|---|---|---|
| 945,236 | Hollerth | Jan. 4, 1910 |
| 1,534,531 | Lake | Apr. 21, 1925 |
| 1,812,838 | Bryce | June 30, 1931 |
| 1,882,766 | Bryce | Oct. 18, 1932 |
| 1,926,891 | Bryce | Sept. 12, 1933 |
| 2,016,682 | Mills | Oct. 8, 1935 |
| 2,056,391 | Daly | Oct. 6, 1936 |
| 2,069,631 | Thomas | Feb. 2, 1937 |
| 2,111,122 | Mills | Mar. 15, 1938 |
| 2,181,996 | Knutson | Dec. 5, 1939 |
| 2,237,153 | Neumann-Lezius | Apr. 1, 1941 |
| 2,297,803 | Scheerer | Oct. 6, 1942 |
| 2,302,064 | Sieg | Nov. 17, 1942 |
| 2,328,653 | Lake | Sept. 7, 1943 |
| 2,399,724 | Dilling | May 7, 1946 |
| 2,492,071 | Svensson | Dec. 20, 1949 |